3,579,600
CATALYST FOR THE INTERCONVERSION OF PROPYNE AND PROPADIENE

Richard T. Dickerson, Midland, Mich., assignor to The Dow Chemical Company, Midland, Mich.
No Drawing. Filed Nov. 8, 1968, Ser. No. 774,487
Int. Cl. C07c 11/14, 11/22
U.S. Cl. 260—678     10 Claims

ABSTRACT OF THE DISCLOSURE

Propyne and propadiene are catalytically interconverted by a mixture of a highly polar solvent, e.g. dimethyl sulfoxide, and a base, e.g. potassium hydroxide. This process facilitates the conversion of $C_3H_4$ mixtures entirely to either propyne or propadiene as may be required for specific chemical application.

BACKGROUND OF THE INVENTION

The chemical utilization of propyne or propadiene would be greatly aided by the ability to readily interconvert these two isomeric hydrocarbons so that the entire $C_3H_4$ content of their mixtures, in which form they usually exist, could be realized. Methods are known by which this interconversion can be accomplished, but these processes, in general, involve treatment of the $C_3H_4$ mixture under such drastic conditions that some $C_3H_4$ can be destroyed. For specific examples of these catalytic processes, see U.S. Pat. No. 3,235,617; U.S. Pat. No. 3,235,618; Fr. Pat. No. 1,370,415; Fr. Pat. No. 1,370,416 (all using activated aluminas); Raphael, "Acetylenic Compounds in Organic Synthesis," Butterworths Sci. Pub., London, 1955 (alkalis in alkanols); and Gr. Pat. No. 1,093,350 (activated carbon).

It is also known that monoolefins can be isomerized by certain solvent-base systems, e.g. dimethyl sulfoxide and potassium hydroxide. See U.S. Pat. No. 3,213,155.

SUMMARY OF THE INVENTION

It has now been found that the interconversion of propyne and propadiene is readily brought about by contacting a $C_3H_4$-containing gas with a catalytic solution of high basicity. By interconverting the $C_3H_4$ mixture in this manner, highly efficient yields of propyne or propadiene are obtained without significant loss of $C_3H_4$. The term "$C_3H_4$," as used herein, is meant to denote only propadiene, propyne or their mixtures. In addition to interconversion of a $C_3H_4$ gas, the catalyst also is selective in that it separates the $C_3H_4$ gas from a $C_3H_4$-containing gaseous stream. Moreover, the catalyst solution is not consumed during use and has a long life, thus ensuring economical operation.

In order to practice the invention, a $C_3H_4$-containing gas is contacted in any convenient manner with the catalytic solution. For example, one method of operation is to pass the $C_3H_4$-containing gas through the catalytic solution. Another method is to pass the gas through a bed, e.g. of soda lime, moistened with the catalytic solution.

The catalytic solution comprises a mixture of a dipolar aprotic solvent and a base. The dipolar aprotic solvent is characterized by having a dielectric constant above about ten, having a center of high electron density (e.g. oxo or nitrilo) and being stable to hydroxide and alkoxide attack. Specific examples of such solvents are the dialkyl sulfoxides; e.g. dimethyl sulfoxide (DMSO) diethyl sulfoxide, methyl ethyl sulfoxide; the heterocyclic sulfoxides, e.g. tetrahydrothiophene - 1 - oxide (THTP); the alkylenepolyamines; e.g. ethylenediamine, diethylenetriamine; the aromatic heterocyclic amines, e.g. pyridine; the alkanolamines, e.g. ethanolamine and diisopropanolamine; the aromatic heterocyclic amine oxides, e.g. pyridine-N-oxide, picoline-N-oxide; and the trialkyl phosphine oxides, e.g. trimethyl phosphine oxide, triethyl phosphine oxide and tributyl phosphine oxide. Of course, mixtures of these solvents can be effectively employed, e.g. mixtures of ethanolamine and ethylenediamine is a suitable solvent.

The base used is an alkoxide or hydroxide of an alkali metal having an atomic number greater than 10. For example, potassium hydroxide, sodium hydroxide, rubidium hydroxide, cesium hydroxide, sodium methoxide, potassium ethoxide and cesium butoxide are effective bases for use in this invention. A preferred catalyst comprises a mixture of dimethyl sulfoxide and potassium hydroxide. The weight ratio of solvent to base is not critical, and may be varied widely, e.g. from 1:10 to 10,000:1 or higher. In general, however, it is preferred to use ratios of between 50:1 and 1000:1.

Although not critical to this invention, it may be advantageous to increase the solubility of the base in the solvent by adding a co-solvent. The amount of co-solvent added, if any, is that amount necessary to cause the desired solubility of the base in the solvent. In general, a weight ratio of co-solvent to solvent between 1:3 and 1:1000 is sufficient. Generally, a saturated solution of the base in the co-solvent is convenient. Typical of the useful co-solvents are water, methanol, ethylene glycol or glycerol. Protic solvents such as methanol, when used in excess, will result in less catalytic mixtures. For example, a weight ratio of DMSO:methanol:potassium hydroxide of 4:3:1 is substantially non-catalytic while the catalytic activity of a 96:3:1 ratio is high. A series of simple tests can be made to determine the effective ratios to yield the activity desired.

Pressure is not critical to this invention, and although atmospheric pressure is preferred, subatmospheric and superatmospheric pressures can be used. A wide range of temperatures can be used in this process. The practical upper limit is that temperature at which the catalytic solution decomposes and the practical lower limit is that temperature at which the catalytic solution freezes. Generally, a temperature of between 0 and 80° C. is preferred and a temperature of between 20 and 60° C. is most preferred. These limits apply to sulfoxides, and especially dimethyl sulfoxide. Other solvents have their melting points as a lower limit, while still others, with greater or less resistance to attack by KOH or other bases, have upper limit temperatures consistent with those mentioned.

At equilibrium at room temperature, the ratio of propyne to propadiene is around 8:1 in the gas phase and, owing to the greater solubility of propyne, the ratio in the liquid phase is around 16:1. This process is reversible in that equilibrium is approached whether the $C_3H_4$-containing gas contains propyne without propadiene, propadiene without propyne or mixtures of propyne and propadiene.

DESCRIPTION OF SPECIFIC EMBODIMENTS

There are several ways to contact the catalytic solution with the $C_3H_4$-containing gas mixture. Two methods are reported below.

Serum bottle runs

The catalytic solutions were placed in 125 ml. serum bottles and stoppered. Two hypodermic needles were inserted, one as a sparger and the other as a vent. A commercial mixture of propyne and propadiene (ratio, 1.12:1), typically containing as diluent other gaseous hydrocarbons such as propane, propene and butanes, was passed through the solution until the latter was saturated, generally for 25 minutes, the needles were removed, and the mixtures allowed to stand for the prescribed time.

After the period of standing given, the contents of the bottles were analyzed as follows: Gas phase—A sample of the gas was withdrawn by means of a hypodermic needle and syringes and inserted into a gas-liquid chromatograph equipped with a dimethylsulfolane-on-firebrick column. Analyses listed were calculated from areas of elected component peaks Liquid phase—A sample of liquid phase was withdrawn and the gas dissolved therein released by diluting the liquid with water or preferably warm (60° C.) sodium chloride brine in which the gases are less soluble. Chromatographic analyses of released gas were obtained as with gas phase samples.

The results are reported in Table I below.

bottles were allowed to stand for 20 hours at room temperature and the results are reported below.

TABLE II

Experiment No. 16

Sparge time—25 min.
Vapor phase ratio PY/PD—9.23
Liquid phase ratio PY/PD—22.85

PY=propyne.
PD=propadiene.

I claim:
1. A method of equilibrating an acyclic $C_3H_4$ hydrocarbon gas to form the equilibrium mixture of propyne

TABLE I.—INTERCONVERSION OF PROPYNE AND PROPADIENE BY CATALYTIC SYSTEM—SERUM BOTTLE RUNS

| | Catalytic solution, composition by weight | | | | | | Temperature, °C. | Ratio, propyne to propadiene | |
|---|---|---|---|---|---|---|---|---|---|
| | Base | Percent | Solvent | Percent | Co-solvent | Percent | Standing time | | Vapor phase | Liquid phase |
| Example No.: | | | | | | | | | | |
| 1 | KOH | 10 | D.M.S.O. | 80 | H₂O | 10 | 25 minutes | Room | 7.84 | — |
| 2 | KOH | 3 | Same | 87 | Same | 10 | do | do | 6.45 | 15.12 |
| 3 | KOH | 3 | do | 77 | do | 20 | 20 hours | do | 4.29 | — |
| 4 | KOH | 10 | do | 70 | do | 20 | do | do | 7.47 | — |
| 5 | KOH | 3 | do | 94 | do | 3 | do | do | 8.40 | — |
| 6 | KOH | 1 | do | 96 | Ethylene glycol | 3 | do | do | 9.61 | 16.1 |
| 7 | KOH | 5 | do | 80 | Methanol | 15 | do | do | 9.42 | 13.3 |
| 8 | KOH | 5 | do | 80 | Ethylene glycol | 14 | do | do | 6.95 | 7.57 |
| 9 | KOH | 1 | do | 96 | Methanol | 3 | do | do | 8.50 | 14.49 |
| 10 | KOH | 0.1 | do | 99.4 | do | 0.3 | do | do | 7.27 | 16.19 |
| 11 | KOH | 2.5 | do | 90 | do | 7.5 | do | do | 8.36 | 14.55 |
| 12 | KOH | 1 | do | 96 | do | 3 | do | 60 | 7.17 | 5.04 |
| 13 | KOH | 1 | T.H.T.P. | 96 | do | 3 | do | Room | 9.10 | 6.32 |
| 14 | KOH | 1 | (¹) | 90 | do | 9 | do | do | 8.71 | 12.34 |
| 15 [2] | | | Soda lime moist with D.M.S.O. | | | | do | do | 8.56 | (³) |

[1] 50:50 mixture of ethylenediamine and ethanolamine by volume.
[2] The catalyst mixture may also be situated in a fixed bed system suitable for interconversion. Soda lime moist with D.M.S.O. gives such a catalyst. PD=propadiene. PY=propyne.
[3] No free liquid phase.

NOTE:
—=indicates no analysis.
NaOH; D.M.S.O.; methanol in a weight ratio of 1:94:5 also showed good catalytic activity in similar experiments.

Continuous run

Continuous-run reactions were also examined. A solution of 1 part by weight of potassium hydroxide, 3 parts of methanol, and 96 parts of dimethyl sulfoxide was prepared and placed into a 1¾″ I.D. glass tubular gas-washing column that was packed with ¼″ berl saddles. The solution depth was 23″. A mixture of propadiene and propyne containing minor proportions of propane and other miscellaneous inert hydrocarbons was introduced into the column at the bottom at a rate of 2 gram moles total gas per hour. The gas fed to the column throughout the experiment had a volume ratio of 0.67:1:1.35 parts of propane, propadiene and propyne, respectively. Propane and the other miscellaneous inert gases are not affected by this treatment and pass through the reactor unchanged after the liquid is saturated. The bubble size was such that several seconds were required for each bubble to traverse the liquid. After some time the solution was evidently saturated with gases since no further increase in volume of the solution occurred (increase was about 8% at atmospheric pressure). Bubbling was continued until the composition of the emergent gases reached a steady state, requiring about 4 hours. The composition of the exit gas was then in the ratio of 2.1 parts propane, 1 part propadiene and 6.5 parts propyne, by volume.

Propyne feed

That the process is reversible was demonstrated by a separate series of serum bottle runs. In these runs, pure propyne was used as the feedstock and sparged into the bottle for the designated time. Potassium hydroxide, D.M.S.O. and methanol were the base, solvent and co-solvent, respectively, at a weight ratio of 1:96:3. The and propadiene which comprises contacting said gas with a catalytic solution of (1) a dipolar aprotic solvent having a dielectric constant above ten that is stable to hydroxide and alkoxide attack and (2) an alkoxide or hydroxide of an alkil metal having an atomic number greater than ten.

2. A method as defined in claim 1 wherein the $C_3H_4$ hydrocarbon is simultaneously separated from a $C_3H_4$-containing gaseous stream by said contacting.

3. A method as defined in claim 1 wherein the dipolar solvent is a dialkyl sulfoxide, a heterocyclic sulfoxide, an alkylenepolyamine, an aromatic heterocyclic amine, an alkanolamine, an aromatic heterocyclic amine oxide, a trialkyl phosphine oxide or mixtures thereof.

4. A method as defined in claim 1 wherein the weight ratio of dipolar solvent to alkali metal alkoxide or hydroxide is between 1:10 and 1000:1.

5. A method as defined in claim 1 wherein the temperature is between 0 and 80° C.

6. A method as defined in claim 3 wherei na co-solvent is used to improve the solubility of the alkali metal alkoxide or hydroxide in the dipolar solvent.

7. A method as defined in claim 3 wherein the dipolar solvent is dimethyl sulfoxide, diethyl sulfoxide, methyl ethyl sulfoxide, tetrahydrothiophene-1-oxide, ethylenediamine, diethylenetriamine, pyridine, ethanolamine, pyridine-N-oxide, picoline-N-oxide, or tributyl phosphine oxide.

8. A method as defined in claim 1 wherein the alkali metal hydroxide or alkoxide is sodium hydroxide or potassium hydroxide.

9. A method as defined in claim 7 wherein the co-solvent is water, methanol, ethylene glycol or glycerol.

10. A method as defined in claim 7 wherein the dipolar solvent is dimethyl sulfoxide, the alkali metal hydroxide or alkoxide is potassium hydroxide and the co-solvent is methanol.

References Cited

UNITED STATES PATENTS

| | | | |
|---|---|---|---|
| 3,235,617 | 2/1966 | Happel et al. | 260—678 |
| 3,235,618 | 2/1966 | Happel et al. | 260—678 |
| 3,213,155 | 10/1965 | Schriesheim et al. | 260—683.2 |
| 3,369,054 | 2/1968 | Ferrar | 260—678 |

OTHER REFERENCES

"Isomerization of Allenes to Conjugated Diene With Potassium Tert-butoxide," Smadja (Lab. Chim. Organ., Paris) 3950 (1963).

"The Propyne-Allene Equilibrium," Cordes et al., Chem. Ber. 92, 1055–62 (1959).

DELBERT E. GANTZ, Primary Examiner

G. E. SCHMITKONS, Assistant Examiner

U.S. Cl. X.R.

260—680